(12) United States Patent
Busch et al.

(10) Patent No.: US 8,231,978 B2
(45) Date of Patent: Jul. 31, 2012

(54) SIMULTANEOUSLY DRAWN OPAQUE FILM MADE OF PLA

(75) Inventors: Detlef Busch, Saarlouis (DE); Bertram Schmitz, Sarreguemines (FR)

(73) Assignee: Treofan Germany GmbH & Co. KG (DE)

( * ) Notice: Subject to any disclaimer, the term of this patent is extended or adjusted under 35 U.S.C. 154(b) by 581 days.

(21) Appl. No.: 12/444,420

(22) PCT Filed: Sep. 21, 2007

(86) PCT No.: PCT/EP2007/060031
§ 371 (c)(1),
(2), (4) Date: Apr. 6, 2009

(87) PCT Pub. No.: WO2008/040646
PCT Pub. Date: Apr. 10, 2008

(65) Prior Publication Data
US 2010/0092791 A1    Apr. 15, 2010

(30) Foreign Application Priority Data
Oct. 5, 2006    (DE) .......................... 10 2006 047 058

(51) Int. Cl.
*B32B 15/04* (2006.01)

(52) U.S. Cl. ........ 428/457; 428/461; 428/500; 428/515; 428/523

(58) Field of Classification Search .................. 428/457, 428/461, 500, 515, 523
See application file for complete search history.

(56) References Cited

U.S. PATENT DOCUMENTS

| | | |
|---|---|---|
| 5,087,677 A | 2/1992 | Brekner et al. |
| 5,208,297 A | 5/1993 | Ford et al. |
| 5,247,058 A | 9/1993 | Gruber et al. |
| 5,324,801 A | 6/1994 | Brekner et al. |
| 5,357,035 A | 10/1994 | Gruber et al. |
| 5,371,158 A | 12/1994 | Brekner et al. |
| 5,744,664 A | 4/1998 | Brekner et al. |
| 5,791,031 A | 8/1998 | Stefﬂ |
| 6,169,052 B1 | 1/2001 | Brekner et al. |
| 6,627,695 B2 | 9/2003 | Murschall et al. |
| 6,641,924 B1 | 11/2003 | Peiffer et al. |
| 6,815,079 B2 | 11/2004 | Rosenbaum et al. |
| 2002/0160215 A1 | 10/2002 | Peiffer et al. |
| 2006/0115548 A1 | 6/2006 | Marchante Moreno et al. |

FOREIGN PATENT DOCUMENTS

| | | |
|---|---|---|
| DE | 109224 | 10/1974 |
| DE | 237070 A3 | 7/1986 |
| DE | 19840991 A1 | 3/2000 |
| DE | 19932384 A1 | 1/2001 |
| EP | 0283164 A2 | 9/1988 |
| EP | 0407870 A2 | 1/1991 |
| EP | 0156464 B1 | 5/1996 |
| EP | 0485893 B1 | 4/1998 |
| EP | 0503422 B1 | 6/1998 |
| EP | 1068949 A1 | 1/2001 |
| EP | 1127912 A1 | 8/2001 |
| EP | 0785858 B1 | 12/2001 |
| EP | 1112167 B1 | 1/2003 |
| JP | 5230253 A | 9/1993 |
| JP | 2005344059 A | 12/2005 |
| WO | WO-02/88230 A1 | 11/2002 |
| WO | WO-03/033574 A1 | 4/2003 |

OTHER PUBLICATIONS

U.S. Appl. No. 12/444,414, filed Apr. 6, 2009, Detlef Busch et al.

*Primary Examiner* — Edward Cain
(74) *Attorney, Agent, or Firm* — Connolly Bove Lodge & Hutz LLP

(57) ABSTRACT

The present invention relates to simultaneously drawn opaque biaxially oriented film made of at least one cycloolefin copolymer (COC) containing layer. The COC is preferably at a concentration of 0.5 to 30% by weight, based on the layer. The invention further relates to an opaque, biaxially oriented polyhydroxycarboxylic acid film containing at least one layer containing a polymer based on hydroxycarboxylic acids and a cycloolefin copolymer (COC). The invention further relates to a process for producing the PHC film and the use thereof.

27 Claims, No Drawings

SIMULTANEOUSLY DRAWN OPAQUE FILM MADE OF PLA

CROSS-REFERENCE TO RELATED APPLICATIONS

This application is a national stage application (under 35 U.S.C. §371) of PCT/EP2007/060031, filed Sep. 21, 2007, which claims benefit of German application 10 2006 047058.3, filed Oct. 5, 2006.

BACKGROUND OF THE INVENTION

The present invention relates to an opaque, biaxially oriented polyhydroxycarboxylic acid film comprising at least one layer comprising a polymer based on hydroxycarboxylic acids and a cycloolefin copolymer (COC). The invention further relates to a process for producing the PHC film and the use thereof.

Opaque, biaxially oriented films are known in prior art. These films are characterized by a glossy, white, pearly visual appearance that is desirable for certain applications. In addition, such films have a reduced density allowing the user to obtain an increased yield.

EP 1 068 949 (DE 199 32 384) describes a white, biaxially oriented PET film having at least one layer comprising a cycloolefin copolymer (COC) in a concentration of 2 to 60% by weight, based on the layer. The glass transition temperature of the cycloolefin copolymer (COC) is in the range of 70 to 270° C. It is described that the COC leads to a whitening of the PET film. Simultaneous orientation, i.e. orienting at the same time in both directions (machine direction and transverse direction), to produce the film is not recommended since this simultaneous stretching does not lead to the desired degree of whiteness.

WO 03/033574 describes the production of an opaque film having vacuoles using simultaneous stretching methods. These films are made of polypropylene and comprise special inorganic vacuole-initiating particles. It is described that the particles must have a special shape or a special size distribution in order to initiate vacuoles despite simultaneous stretching. It is indicated that the particles must be rod-like or platelet-like. Alternatively, spherical particles can also be used if they have a minimum size of 3 μm and a narrow size distribution.

EP 1 112 167 describes problems occurring when known technologies are transferred from the sequential stenter process to simultaneous stretching methods. In particular, incompatible additives do not generate vacuoles in polypropylene film during production by means of simultaneous stretching methods, as is the case with sequential orientation. EP 1 112 167 describes solving this problem by using foaming agents in the simultaneous orientation. The foaming agents decompose at the extrusion temperatures and during simultaneous orientation lead to small gas-filled bubbles, similar to the vacuoles generated by incompatible particles. However, the opacity and degree of whiteness of these polypropylene films is very unsatisfactory.

WO 02/088230 describes opaque, biaxially oriented PLA films comprising in at least one layer 0.5 to 30% by weight of COC having a glass transition temperature of 70 to 270° C. This special COC causes the formation of vacuoles during the production of the PLA film by means of sequential biaxial orientation. Further methods for producing the PLA film are not specified. The mechanical properties of the film are in need of improvement.

In the search for further vacuole-initiating additives for PLA films, it became apparent that the mechanisms during vacuole formation in a PLA matrix are different from those in a polypropylene matrix. With PLA films, not just the incompatibility of the particles seems to be important since particles incompatible with the PLA, such as for example $CaCO_3$ or polypropylene, do not lead to vacuole formation or do so only to a completely insufficient extent during biaxial orientation. To date, the COC polymers according to WO 02/088230 are de facto the only known effective vacuole formers in biaxially oriented PLA films.

In principle, the formation of vacuoles is based on the generation of microcracks at the interface between the polymer and the particulate additive during longitudinal stretching. During subsequent transverse stretching, these fine longitudinal cracks tear open to form air-filled, closed hollow spaces. Hence, it seems plausible that the generation of vacuoles during simultaneous orientation is disproportionately more difficult than during sequential orientation. Indeed, it becomes apparent in practice that the particles incompatible in polypropylene that are common, such as $CaCO_3$ or PBT, do not generate vacuoles at all or generate them only with a selective particle shape or particle size (see WO03/033574) during simultaneous orientation. For this process, an alternative technology for generating vacuoles by means of foaming agents was therefore developed.

Similar problems are known about the production of vacuole-containing films made of polyethylene terephthalate. With these films, the generation of vacuoles in a sequential orientation is also technically much more difficult than with polypropylene films. The LISIM process for producing vacuole-containing PET films is therefore explicitly not recommended (see EP 1 068 949).

BRIEF SUMMARY OF THE INVENTION

It was the object of the present invention to provide environmentally friendly films and packaging, which on the one hand are produced from raw materials that grow back and on the other hand can be disposed in an environmentally friendly manner. In addition, the films should have an opaque appearance and a density of less than 1.25 g/cm³. Furthermore, the film should have good mechanical properties.

The object is solved by an opaque, biaxially oriented film having at least one layer, the characteristic features of which consist of this layer comprising at least one polymer I made of at least one hydroxycarboxylic acid (PHC) and 0.5 to 30% by weight, based on the layer, of a cycloolefin copolymer (COC) having a glass transition temperature in the range of 70 to 270° C. and the film being simultaneously oriented.

This object is further solved by an opaque, biaxially oriented film composed of at least one COO-containing layer comprising a polymer I made of at least one hydroxycarboxylic acid and 0.5 to 30% by weight, based on the layer, of a cycloolefin copolymer (COC) having a glass transition temperature in the range of 70 to 270° C., the film exhibiting in each direction, i.e. in the longitudinal direction and in the transverse direction, a shrinkage of less than 3%, preferably less than 2%.

This object is further solved by an opaque, biaxially oriented film composed of at least one COC-containing layer comprising a polymer I made of at least one hydroxycarboxylic acid and 0.5 to 30% by weight, based on the layer, of a cycloolefin copolymer (COC) having a glass transition temperature in the range of 70 to 270° C., the film exhibiting in the longitudinal direction and/or transverse direction a shrinkage of $\geq 3\%$, preferably >8 to 50%, more preferably 10-25%.

The object is further solved by a method for producing a PHC film in which a melt of PHC, preferably PLA, and 0.5 to 30% by weight of COC, based on the weight of the mixture, and optionally further additives is extruded, this melting temperature being at least 10° C. above the Tg of the COC, the melt is cooled to a pre-film, and the cooled pre-film is subsequently simultaneously oriented in the longitudinal and transverse direction at a temperature of greater than 40° C.

DETAILED DESCRIPTION OF THE INVENTION

From the entirety of the known teachings about simultaneous orientation and vacuole formation in films made of different polymers such as PP, PLA, or PET described above, it was originally concluded that the production of a vacuole-containing opaque film made of PLA by means of simultaneous orientation is practically impossible since generating vacuoles by simultaneous orientation in general and the formation of vacuoles specifically in PLA films is particularly problematic. It was therefore completely unexpected that an opaque PLA film having a reduced density and vacuoles can be produced by means of simultaneous orientation.

In terms of the present invention, a reduced density film refers to a film, the density of which is below the density calculated from the composition and the density of the starting materials. A reduced density for PLA films is a density of <1.25 g/cm$^3$.

In terms of the present invention, an opaque, biaxially oriented PHC film refers to a film having a degree of whiteness of at least 10%, preferably more than 20%, and an opacity of more than 20%, preferably more than 25%. The luminous transmittance according to ASTM-D 1003-77 of such opaque films is generally less than 95%, preferably less than 75%.

To achieve the desired visual appearance and the reduced density, the portion of the cycloolefin copolymer (COC) in the layer must be greater than 0.5% by weight, based on the weight of the layer. On the other hand, if the cycloolefin copolymer (COC) content is greater than 30% by weight, the film cannot be disposed in an environmentally friendly manner.

Furthermore, it is necessary that the glass transition temperature of the cycloolefin copolymer (COC) used is greater than 70° C. It was found that with a COC having a glass transition temperature of less than 70° C., the desired effects with respect to reduction of the film density and with respect to visual appearance of the film are not achieved. Furthermore, with a glass transition temperature of the COC of less than 70° C., the raw material mixture is difficult to process (difficult to extrude), the desired degree of whiteness is no longer achieved, and the reclaim used results in a film that tends to have an increased yellow coloring. If on the other hand the glass transition temperature of the selected cycloolefin copolymer (COC) is greater than 270° C., the raw material mixture can no longer be sufficiently homogeneously dispersed in the extruder. This results in a film having non-homogeneous properties.

In a preferred embodiment of the film according to the invention, the glass transition temperature of the COCs used is in a range of 90 to 200° C., and in a particularly preferred embodiment in a range from 110 to 160° C.

It was found that by simultaneous stretching, an opaque, glossy film having reduced density, improved mechanical properties, and selective shrinkage values can be produced. Surprisingly, vacuoles form in the PHC polymer matrix as a result of the addition of COC despite the film not being sequentially, but simultaneously oriented. Unexpectedly, the film shows increased tear strength in the longitudinal direction, which is not achieved with a sequentially oriented, vacuole-containing film. Surprisingly, the simultaneously oriented, opaque PHC films are characterized by especially low shrinkage, which is significantly reduced compared to transparent PHC films produced under comparable process conditions.

The film according to the invention is single-layered or multi-layered. Single-layered embodiments are composed in the same way as the COC-containing layer described below. Multi-layered embodiments have at least two layers and always comprise the COC-containing layer and at least one additional layer, the COC-containing layer being the base layer, optionally the intermediate or cover layer of the multi-layered film being the COC-containing layer. In a preferred embodiment, the COC-containing layer forms the base layer of the film having at least one cover layer, preferably having cover layers on both sides, intermediate layer(s) optionally being present on one or both sides. The film can also have several COC-containing layers with vacuoles.

In a further preferred embodiment, the COC-containing layer forms an intermediate layer of the multi-layered film. Further embodiments with COC-containing intermediate layers are five-layered and have besides a base layer optionally containing COC a COC-containing intermediate layer on both sides. In a further embodiment, the COC-containing layer can form cover layer(s) on the base layer or the intermediate layer. Optionally, both cover layers can contain COC. In terms of the present invention, the base layer is the layer that accounts for more than 30% up to 100%, preferably 50 to 90%, of the total film thickness and has the largest layer thickness. The cover layers are the layers that form the outer layers of the film. Intermediate layers are disposed by nature between the base layer and the cover layers.

The COC-containing layer, which is optionally the only layer of the film according to the invention, comprises a polymer I made of at least one hydroxycarboxylic acid, at least one COC, and optionally further additives, each in effective quantities. This layer generally contains at least 50 up to 99.5% by weight, preferably 70 to 99% by weight, most preferably 80 to 95% by weight, of a polymer I made of at least one hydroxycarboxylic acid, based on the weight of the layer. Polymers I made of at least one hydroxycarboxylic acid are homopolymers or mixed polymers that are composed of polymerized units of, preferably aliphatic, hydroxycarboxylic acids. Among the PHC suitable for the present invention are in particular polylactic acids. These are referred to as PLA below. The term PLA refers here also to both homopolymers, which are composed only of lactic acid units, and mixed polymers, which contain predominantly lactic acid units (>50%) in combination with other aliphatic hydroxycarboxylic acid units.

Suitable as monomers of aliphatic polyhydroxycarboxylic acids (PHC) are in particular aliphatic mono-, di-, or trihydroxycarboxylic acids or dimeric cyclic esters thereof, among which lactic acid in its D- or L-form is preferred. A suitable PLA is for example polylactic acid from Cargill Dow (NatureWorks®). The production of polylactic acid is known in prior art and occurs via catalytic ring opening polymerization of lactide (1,4-dioxane-3,6-dimethyl-2,5-dione), the dimeric cyclic ester of lactic acid; PLA is therefore often referred to as polylactide. In the following publications, the production of PLA is described—U.S. Pat. No. 5,208,297, U.S. Pat. No. 5,247,058, or U.S. Pat. No. 5,357,035.

Polylactic acids composed solely of lactic acid units are preferred. PLA homopolymers comprising 80-100% by weight of L-lactic acid units, corresponding to 0 to 20% by weight of D-lactic acid units, are particularly preferred. To reduce the crystallinity, even higher concentrations of D-lactic acid units as comonomer may also be comprised. Optionally, the polylactic acid can additionally have aliphatic hydroxycarboxylic acid units different from lactic acid as comonomer, for example glycolic acid units, 3-hydroxypropionic acid units, 2,2-dimethyl-3-hydroxypropionic acid units, or higher homologs of hydroxycarboxylic acids having up to 5 carbon atoms.

Lactic acid polymers (PLA) having a melting point of 110 to 170° C., preferably from 125 to 165° C., and a melt flow index (measured according to DIN 53 735 with a 2.16 N load and at 190° C.) of 1 to 50 g/10 min, preferably from 1 to 30 g/10 min, are preferred. The molecular weight of PLA is in a range of at least 10,000 to 500,000 (number average), preferably 50,000 to 300,000 (number average). The glass transition temperature Tg is in a range from 40 to 100° C., preferably 40 to 80° C.

According to the invention, the COC-containing layer or the film in case of single-layered embodiments comprises a cycloolefin copolymer (COC) in a quantity of at least 0.5% by weight, preferably 1 to 30% by weight, and especially preferably 5 to 20% by weight, based on the weight of the layer or based on the weight of the film in case of single-layered embodiments.

Cycloolefin copolymers are homopolymers or copolymers composed of polymerized cycloolefin units and optionally acyclic olefins as comonomer. Cycloolefin polymers comprising 0.1 to 100% by weight, preferably 10 to 99% by weight, particularly preferably 50-95% by weight, each based on the total mass of the cycloolefin polymer, of polymerized cycloolefin units are suitable for the present invention. Particularly suitable cycloolefin polymers are described in detail in EP 1 068 949, which is hereby explicitly referenced.

Among the cycloolefin copolymers described above and in EP 1 068 949, in particular those comprising polymerized units of polycyclic olefins having a norbornene basic structure, especially preferably norbornene or tetracyclododecene, are preferred. Cycloolefin copolymers (COC) comprising polymerized units of acyclic olefins, in particular ethylene, are also particularly preferred. Again, norbornene/ethylene and tetracyclododecene/ethylene copolymers comprising 5 to 80% by weight, preferably 10 to 60% by weight of ethylene (based on the weight of the copolymer) are especially preferred.

The cycloolefin polymers generically described above and in EP 1 068 949 generally have glass transition temperatures between 100° C. and 400° C. Cycloolefin copolymers (COC) having a glass transition temperature of greater than 70° C., preferably greater than 90° C., and most preferably greater than 110° C., can be used in the invention. The viscosity number (Dekalin, 135° C., DIN 53 728) is advantageously between 0.1 and 200 ml/g, preferably between 50 and 150 ml/g.

The production of the cycloolefin copolymers (COC) occurs by a heterogeneous or homogeneous catalysis with organometallic compounds and is described in numerous documents. Suitable catalyst systems based on mixed catalysts made of titanium or vanadium compounds in combination with aluminum organyls are described in DD 109 224, DD 237 070, and EP-A-0 156 464. EP-A-0 283 164, EP-A-0 407 870, EP-A-0 485 893, and EP-A-0 503 422 describe the production of cycloolefin copolymers (COC) with catalysts based on soluble metallocene complexes. The production methods of cycloolefin polymers described in the publications mentioned above are hereby explicitly referenced.

The cycloolefin copolymers are incorporated into the film either as pure granulate or as granulated concentrate (masterbatch) by pre-mixing the granulate of PHC, preferably PLA, with the cycloolefin copolymer (COC) or the cycloolefin copolymer (COC) masterbatch and subsequently feeding it to the extruder. In the extruder, the components are mixed further and heated to the processing temperature. It is advantageous for the method according to the invention that the extrusion temperature is above the glass transition temperature Tg of the cycloolefin copolymer (COC), generally at least 10° C., preferably 15 to 100° C., most preferably 20 to 150° C., above the glass transition temperature of the cycloolefin copolymer (COC).

Besides the COC-containing layer, the film preferably comprises additional layers that can form the base layer, an intermediate layer or a cover layer. These additional layers are composed of the polyhydroxycarboxylic acid (PHO) described above for the COO-containing layer. PLA is similarly preferred for these further layers.

The COO-containing layer and the other layers may additionally comprise common additives such as neutralizing agents, stabilizers, antiblocking agents, lubricants, and other filler materials. Advantageously, they are already added to the polymer or the polymer mixture prior to melting. Phosphorous compounds, such as phosphoric acid or phosphoric acid esters, for example are used as stabilizers.

Typical antiblocking agents are inorganic and/or organic particles, for example calcium carbonate, amorphous silica, talcum, magnesium carbonate, barium carbonate, calcium sulfate, barium sulfate, lithium phosphate, calcium phosphate, magnesium phosphate, aluminum oxide, carbon black, titanium dioxide, kaolin, or crosslinked polymer particles, for example polystyrene, acrylate, PMMA particles, or crosslinked silicones. Muscovite mica having an average particle size (weighted average) of 4.0-12 µm, preferably 6 to 10 µm, is also particularly suitable. As is generally known, mica is composed of platelet-like silicates, the aspect ratio of which is preferably in the range from 5 to 50. The antiblocking agent concentration is generally 0.01 to a maximum of 1% by weight, based on the weight of the cover layer; transparent embodiments should not contain more than 0.5% by weight with regard to low haze. Mixtures of two and more different antiblocking agents or mixtures of antiblocking agents having the same composition but a different particle size can also be chosen as additives. The particles can be added directly or by means of masterbatches to the polymers of the individual layers of the film in the respective advantageous concentrations during extrusion. Antiblocking agents are preferably added to the cover layer(s).

Glycerin fatty acid esters wherein one, two, or all three alcohol functions are esterified with a fatty acid are particularly suitable as antistatic agents. Monoesters wherein only one alcohol group of the glycerin is esterified with a fatty acid, so-called glycerin monofatty acid esters, are preferred. Suitable fatty acids of these compounds have a chain length of 12 to 20 C atoms. Stearic acid, lauric acid, or oleic acid is preferred. Glycerin monostearate (GMS) has proven to be particularly advantageous. Glycerin fatty acid ester is preferably used in the cover layer and in particular in a quantity of 1 to 10% by weight, more preferably 2 to 6% by weight. In an embodiment particularly advantageous with respect to antistatic behavior, GMS is combined with one of the antiblocking particles described above.

In a further possible embodiment, starch-based particles are added to the cover layer in a quantity of 0.01-10% by weight, in particular 0.01 to 5% by weight, based on the weight of the cover layer, to improve the antistatic and antiblocking behavior. Modified and unmodified varieties of starch, for example based on potato starch, corn starch, or wheat starch, are suitable. The original size of the particles is comparatively noncritical since the starch particles are reduced in size during film extrusion. The starch particles generally have an absolute particle size of 1 to 15 µm in the film and can have any regular or irregular particle shape.

To improve the degree of whiteness of the PHC film, the COC-containing layer or at least one of the additional layers can comprise a pigment. In this connection, it has proven to be particularly beneficial to choose barium sulfate having an average particle size of 0.3-0.8 µm, preferably 0.4-0.7 µm, or titanium dioxide having an average particle size of 0.05-1 µm as additional additives. The film hereby obtains a brilliant, white appearance. In these embodiments, the COC-containing layer and/or a further layer generally comprises 1 to 25% by weight, preferably more than 1 to 20% by weight, and most preferably 1 to 15% by weight of pigments, in each case based on the weight of the layer.

The total thickness of the film may vary within wide limits and depends on the intended use. The preferred embodiments of the film according to the invention have total thicknesses of 4 to 200 µm, 8 to 150 µm, in particular 10 to 100 µm, being preferred. The thickness of the optionally present intermediate layer(s) is generally independently from each other 0.5 to 15 µm each, intermediate layer thicknesses of 1 to 10 µm, in particular 1 to 8 µm, being preferred. Each of the specified values refers to one intermediate layer. The thickness of the cover layer(s) is selected independently of the other layers and is preferably in the range of 0.1 to 5 µm, more preferably 0.2 to 3 µm, cover layers applied on both sides being either the same or different with respect to thickness and composition. The thickness of the base layer results accordingly from the difference of the total thickness of the film and the thickness of the applied cover and intermediate layer(s) and therefore can vary within wide limits analogous to the total thickness.

The different embodiments of the film according to the invention described above can be used as substrate for a subsequent metallization. In this connection, in particular such embodiments that are metallized on the surface of a COC-containing layer, i.e. single-layered embodiments and those with an appropriate COC-containing layer as cover layer, have proven to be particularly advantageous. It was found that layers of COC and polymer made of at least one hydroxycarboxylic acid have particularly good metal adhesion.

Furthermore, the described opaque film can be used as label film and as packaging film for packaging foodstuffs and durable goods. Due to advantageous twist wrap properties that PLA film is known to exhibit and that are not affected by the addition of vacuole-forming COCl, the film is also very well suited for twist wrap packaging for hard candy, tampons and the like.

Furthermore, the invention relates to a method for producing the opaque, vacuole-containing PHC film, preferably PLA film. According to the invention, the PHC film, preferably PLA film, is produced by simultaneous stretching methods. In terms of the present invention, simultaneous stretching methods comprise methods in which the film melt is first extruded through a flat film extrusion die and subsequently simultaneously oriented in the longitudinal and transverse direction by means of suitable devices. Such methods and devices for executing the method are known in prior art for example as LISIM or MESIM (mechanical simultaneous orientation) methods. LISIM methods are described in detail in EP 1 112 167 and EP 0 785 858, which are hereby explicitly referenced. A MESIM method is described in US 2006/0115548, which is also explicitly referenced. In a further but nor preferred embodiment, the film can also be produced as blown film since in this method, a simultaneous orientation in the longitudinal and transverse direction takes place as well.

Within the scope of the simultaneous stretching method according to the invention, the procedure involves melting the polymers or the polymer mixture of PHC and COC in an extruder, extruding/coextruding the melt(s) corresponding to the single-layered film or the individual layers of the film through a flat film extrusion die, cooling the extruded melt on one or more rollers at a temperature of 10 to 100° C., preferably 30 to 80° C., for solidification and taking it off. Subsequently, this pre-film is biaxially oriented, the biaxially oriented film is heat-set and optionally plasma-, corona-, or flame-treated on the surface layer intended for treatment.

According to the invention, the biaxial orientation is performed simultaneously in a flat film method. In the process, the film is simultaneously oriented in the longitudinal direction (i.e. in the machine direction=MD) and in the transverse direction (i.e. perpendicular to the machine direction=TD). This results in a biaxial orientation of the molecular chains.

According to the LISIM® method, the simultaneous orientation occurs by a continuous stretching method. The film is conveyed in a stretching oven using a transport system working according to the LISIM® method. The film edges are gripped by so-called clips driven by means of a linear motor. Individual clips, for example every third clip, are equipped with permanent magnets and simultaneously serve as secondary part of a linear motor drive. Over almost the entire continuous transport path, the primary parts of the linear motor drive are disposed parallel to the guide rail. The clips, which are not driven, only serve to absorb the film forces perpendicular to the running direction and to reduce the sagging between the holding points.

After the film edges have been gripped by the clips, the pre-film passes through a preheating zone in which the guide rails of the clips run essentially in parallel. In this section of the stretching oven, the pre-film is heated from the inlet temperature to the stretching temperature by means of a suitable heating device, for example a convection heater or an IR radiator. Afterwards, the simultaneous stretching process starts by accelerating the clip carriages, which are independent of one another, in the film direction and thereby separating them, i.e. increasing their distance with respect to each other. In this way, the film is stretched in the longitudinal direction. Simultaneously, a transverse stretching takes place on top of this process, namely because the guide rails diverge in the area of the clip acceleration.

Afterwards, the film is set with regard to the desired mechanical film properties. A heat setting treatment occurs at an elevated temperature, in which the film optionally relaxes slightly in a controlled manner in the longitudinal or transverse direction in the clamped state. Simultaneous relaxing in the longitudinal and transverse direction can be especially advantageous. Here, the clip carriages are decelerated, whereby their distance with respect to each other is reduced. Simultaneously, the guide rails of the transport system are allowed to converge slightly.

In the MESIM® method, the simultaneous orientation occurs according to a principle equivalent to the LISIM method. The film is also conveyed in a stretching oven using a transport system of clips on guide rails. On each film edge, there is a pair of rails on which opposing clips and clip-like elements are disposed and connected with one another by means of a scissor-type joint. The distance of the clips with respect to one another can be varied by means of the scissor-type joint. By pulling the scissor-type joint apart, the distance of the clips with respect to one another is increased. Reversely, the distance is reduced when the joint is closing. In the stretching oven, the two guide rails of each pair of rails (with scissor-type joint) are disposed in a converging manner whereby the scissor-type joint is pulled apart and the clips accelerate in the running direction of the film and increase their distance with respect to each other. The film is hereby stretched in length. Simultaneously, due to the diverging arrangement of the pairs of rails, a simultaneous stretching in the transverse direction occurs at each film edge.

Simultaneous orientation according to the blown film method, which is not preferred, is known per se. Here, the simultaneous orientation results from blowing up the tubular film in combination with the take-off speed after extrusion through a circular die. These methods are known per se in prior art.

During orientation according to the LISIM or MESIM method described above, the film is generally heated in the preheating zone to a stretching temperature between the glass transition temperature and the melting point of the polyhydroxycarboxylic acid. For PLA films, a temperature range of 60-150° C. is preferred, more preferably 70-110° C., most preferably 80-100° C., in which the simultaneous orientation finally occurs. The stretch ratios may be flexibly chosen, so that the film can comply with different requirements depending on the field of application. The stretch factor in the transverse direction for PLA films is 4-7, preferably 5-7, and the respective stretch factor in the longitudinal direction is 3-6, preferably 4-6.

Stretching of the film is followed by the described heat setting (heat treatment) in which the film is maintained for about 0.1 to 10 s at a temperature of 60 to 150° C. Subsequently, the film is wound up in customary fashion by means of a winding device.

Optionally, the film can be coated to adjust further properties. Typical coatings are adhesion-promoting, antistatic, slip-improving, or dehesive-acting layers. Optionally, these additional layers can be applied by means of in-line coating using aqueous dispersions prior to transverse orientation or off-line.

The film according to the invention is characterized by a good degree of whiteness and good opacity. It is superbly suitable for packaging light-sensitive and/or air-sensitive foodstuffs and semi-luxury food. Aside from that, it is also suitable for use in the industrial sector, for example in the production of embossed films or as label film. It was found that by adding COC, vacuole-like hollow spaces, which reduce the density of the film compared to the corresponding density of the raw materials, are generated in the film. According to the invention, the density is in the range of 0.6 to 1 g/cm$^3$.

The film is further characterized by surprisingly low shrinkage values. This is desirable in some packaging applications. In this connection, it is particularly surprising that compared to the simultaneous orientation of transparent PHC films, merely the addition of COC produces this significant reduction of shrinkage. According to the invention, PLA films having a longitudinal shrinkage and a transverse shrinkage of less than 3% each, preferably >0 to 2%, more preferably >0 to 1%, can hence be produced due to simultaneous orientation in combination with the addition of COC. These are extremely low shrinkage values for the inherently highly shrinking PLA films.

For other applications however, the process conditions can also be varied in such a way that the shrinkage in the longitudinal direction and/or transverse direction is greater than 3% and can be adjusted over a very broad range for individual applications. Hence, films having moderate shrinkage in a range of $\geq 3$ to 8% in the machine and/or transverse direction can be produced by the method according to the invention. For other applications, such as for example shrinkable labels, however, highly shrinking films having a shrinkage of >8 to 50%, preferably 10 to 40%, in the machine and/or transverse direction can also be produced.

The method according to the invention has therefore also the advantage that the shrink properties of the PHC films can be varied over a very broad range by a comparatively simple variation of the process conditions. By appropriately adjusting different temperatures in the setting zones and by slight adjustment in the convergence, almost all ranges of shrinkage from low, medium to high can be covered. The method therefore provides considerable logistic advantages since with the same film recipe, different shrinkable films, and even non-shrinking films, of the same composition can be produced.

For the characterization of the raw materials and films, the following measured values were used:

Degree of Whiteness and Opacity

The determination of the degree of whiteness and the opacity occurs by means of the electrical reflectance photometer "ELREPHO" from Zeiss, Oberkochen (Germany), standard illuminant C, 2 DEG, standard observer. The opacity is determined in accordance with DIN 53 146. The degree of whiteness is defined as WG=RY+3RZ−3RX.

WG=degree of whiteness, RX, RY, RZ=respective reflection coefficients when using the color measuring filters Y, Z, and X. As white standard of reflectance, a pressed piece of barium sulfate (DIN 5033, Part 9) is used. A detailed description is given for example in Hansl Loos "Farbmessung" ("Color Measurement"), published by Verlag Beruf and Schule, Itzehoe (1989).

Luminous Transmittance

The luminous transmittance is measured in accordance with ASTM-D 1033-77.

Shrinkage:

The longitudinal and transverse shrinkage values are based on the respective linear extension of the film (longitudinal L0 and transverse Q0) prior to the shrinkage process. The longitudinal direction is the machine direction; the direction at right angle to the machine run is correspondingly defined as the transverse direction. The film specimen of 10 cm*10 cm is shrunk in a circulating air oven at 100° C. over a period of 5 min. Subsequently, the remaining linear extensions of the specimen are determined again longitudinally and transversely (L1 and Q1). The difference of the determined lengths relative to the original length L0 and Q0 times 100 is given as shrinkage in %.

$$\text{longitudinal shrinkage } L_s[\%] = (L_0 - L_1)/(L_0 * 100[\%])$$

$$\text{transverse shrinkage } Q_s[\%] = (Q_0 - Q_1)/Q_0 * 100[\%]$$

This determination method for the longitudinal and transverse shrinkage is in accordance with DIN 40634.

Glass Transition Temperature

The glass transition temperature Tg was determined with film samples using DSC (Differential Scanning Calorimetry) (DIN 73 765). A DSC 1090 from DuPont was used. The heating rate was 20 K/min and the initial weight was about 12 mg. In the first heating operation, the glass transition temperature Tg was determined. The samples frequently showed enthalpy relaxation (a peak) at the beginning of the step-like glass transition. The temperature at which the step-like change of the heat capacity—independent of the peak-shaped enthalpy relaxation—reached half its height in the first heating operation was used as Tg. In all cases, only a single glass transition step was observed in the thermogram during the first heating.

Below, the invention is explained by means of exemplary embodiments.

EXAMPLE 1

An opaque three-layered PLA film having a thickness of 30 μm was produced by extrusion and subsequent simultaneous orientation on a LISIM unit. The base layer was composed to about 90% by weight of a semicrystalline polylactic acid raw material (4042D from NatureWorks®) having a melting point of 145° C. and a melt flow index of about 3 g/10 min at 210° C. and a glass transition temperature of 60° C.) and about 10% by weight of COC (Ticona Topas 6013 S-04) having a Tg of 140° C. The polylactic acid raw material 4042D from NatureWorks® was used to 100% as cover layer raw material. The thickness of the individual cover layers was 3 μm. The layers additionally comprised stabilizers and neutralizing agents in customary quantities. The production conditions in the individual process steps were:

Extrusion: temperatures 170-200° C.
Temperature of the take-off roll: 30° C.
Stretching temperature in the LISIM frame: 92° C.
Longitudinal stretch ratio: 4.5
Transverse stretch ratio (effective): 5.5
Setting: temperature: 135° C.

EXAMPLE 2

A film having the same composition as described in Example 1 was produced. Analogous to the procedure described in Example 1, an opaque three-layered PLA film also having a thickness of 30 μm was produced by extrusion and subsequent simultaneous orientation on a LISIM unit. In terms of production conditions, the stretching temperature and the setting temperature were reduced compared to Example 1. The settings in the individual process steps were as follows:

Extrusion: temperatures 170-200° C.
Temperature of the take-off roll: 30° C.
Stretching temperature in the LISIM frame: 88° C.
Longitudinal stretch ratio: 4.5
Transverse stretch ratio (effective): 5.5
Setting: temperature: 90° C.

COMPARATIVE EXAMPLE 1

An opaque three-layered PLA film having a thickness of 50 μm was produced by extrusion and subsequent stepwise orientation first in the longitudinal direction and then in the transverse direction. The base layer was composed to about 90% by weight of a semicrystalline polylactic acid raw material (4042D from NatureWorks®) having a melting point of 145° C. and a melt flow index of about 3 g/10 min at 210° C. and a glass transition temperature of 60° C.) and about 10% by weight of COC (Ticona Topas 6013 S-04) having a Tg of 140° C. The polylactic acid raw material (4060D from NatureWorks®) was used as cover layer raw material. The thickness of the individual cover layers was 3 μm. The layers additionally comprised stabilizers and neutralizing agents in customary quantities. The production conditions in the individual process steps were:

Extrusion: temperatures 170-200° C.
Temperature of the take-off roll: 30° C.
Longitudinal stretching: temperature: 68° C.
Longitudinal stretch ratio: 2.5
Transverse stretching: temperature: 78° C.
Transverse stretch ratio (effective): 5.5
Setting: temperature: 135° C.

The properties of the films according to the examples and the comparative example are summarized in the table below:

TABLE 1

|  | Ex. 1 | Ex. 2 | CE 1 |
| --- | --- | --- | --- |
| Density g/cm$^3$ | 1.00 | 0.90 | 1.05 |
| Opacity/% | 54 | 60 | 64 |
| Degree of whiteness/% | 56 | 60 | 65 |
| Tear strength MD N/mm$^2$ | 120 | 120 | 70 |
| Tear strength TD N/mm$^2$ | 135 | 135 | 225 |
| Shrinkage MD/% | 1 | 20 | 2 |
| Shrinkage TD/% | 1 | 22 | 11 |

The invention claimed is:

1. A method for producing a PHC film which comprises extruding in a melt of PHC, and 0.5 to 30% by weight of cycloolefin copolymer (COC), based on the weight of the mixture, and optionally further additives, this melting temperature being at least 10° C. above the Tg of the COC, the melt is cooled to a pre-film, and the cooled pre-film is subsequently simultaneously oriented in the longitudinal and transverse direction at a temperature of greater than 40° C.

2. An opaque, biaxially oriented film which is obtained by the method of claim 1 and is composed of at least one COC-containing layer, which comprises a polymer I made of at least one hydroxycarboxylic acid and 0.5 to 30% by weight, based on the layer, of a cycloolefin copolymer (COC) having a glass transition temperature in the range of 70 to 270° C., and wherein the film is simultaneously oriented.

3. The opaque, biaxially oriented film as claimed in claim 2, which is composed of at least one COC-containing layer, which comprises a polymer I made of at least one hydroxycarboxylic acid and 0.5 to 30% by weight, based on the layer, of a cycloolefin copolymer (COC) having a glass transition temperature in the range of 70 to 270° C., and wherein the film exhibits shrinkage in the longitudinal and transverse direction of less than 3%.

4. The film as claimed in claim 3, wherein the film exhibits shrinkage in the longitudinal and transverse direction of less than 2%.

5. The opaque, biaxially oriented film as claimed in claim 2, which is composed of at least one COC-containing layer, which comprises a polymer I made of at least one hydroxycarboxylic acid and 0.5 to 30% by weight, based on the layer, of a cycloolefin copolymer (COC) having a glass transition temperature in the range of 70 to 270° C., wherein the film exhibits shrinkage in the longitudinal direction and/or transverse direction of $\geq 3\%$.

6. The film as claimed in claim 5, wherein the film exhibits shrinkage in the longitudinal direction and/or transverse direction of >8-50%.

7. The film according to claim 2, wherein the cycloolefin copolymer (COC) is polynorbornene, polydimethyloctahydronaphthalene, polycyclopentene, or poly(5-methyl)norbornene.

8. The film according to claim 2, wherein the cycloolefin copolymer (COC) has a glass transition temperature in the range of 80 to 200° C.

9. The film according to claim 2, wherein said polymer I is made of at least one hydroxycarboxylic acid is composed of aliphatic hydroxycarboxylic acid units.

10. The film according to claim 2, wherein said polymer I is made of lactic acid units and has a melting point of 110-170° C. and a melt flow index of 1-50 g/10 min.

11. The film according to claim 2, wherein the COC-containing layer comprises 1 to 25% by weight of pigments based on the weight of the layer.

12. The film according to claim 2, wherein the COC-containing layer comprises 1 to 25% by weight of $TiO_2$ based on the weight of the layer.

13. The film according to claim 2, wherein the COC-containing layer forms the base layer of the film and a cover layer is applied in addition to one or both sides of the base layer, said cover layer(s) being composed of at least one polymer I made of at least one hydroxycarboxylic acid.

14. The film according to claim 13, wherein between the COC-containing base layer and the cover layer(s), intermediate layer(s) are disposed on one or both sides.

15. The film according to claim 2, wherein the film is single-layered and consists of the COC-containing layer.

16. The film according to claim 2, wherein the COC-containing layer forms a cover layer or an intermediate layer of the film.

17. The film according to claim 2, wherein the film has COC-containing intermediate layers on both sides.

18. The film according to claim 2, wherein the film has a density of less than 1.25 g/cm$^3$.

19. The film according to claim 2, wherein the film has a density of 0.6 to 1 g/cm$^3$.

20. A film according to claim 2, wherein the film is metallized on at least one surface.

21. A film according to claim 20, wherein the COC-containing layer forms a cover layer of the film and this cover layer is metallized.

22. The film according to claim 2, wherein the film is a packaging film, a twist wrap film, or a label film.

23. The method according to claim 1, wherein the film is a PLA film and the orientation of the film occurs with a stretch factor of 3 to 6 in the longitudinal direction and with a stretch factor of 4 to 7 in the transverse direction.

24. The method according to claim 1, wherein the melt is extruded through a flat film extrusion die, and the simultaneous orientation occurs by means of clips that can travel on diverging guide rails and during orientation in the running direction of the film are accelerated in such a way that the distance of the clips with respect to one another increases, whereby simultaneously with the longitudinal orientation, the orientation of the film in the transverse direction occurs.

25. The method according to claim 1, wherein the acceleration of the clips occurs by means of controlled linear motors.

26. The method according to claim 1, wherein the clips are interconnected by means of a scissor-type joint and the spacing of the clips occurs by moving the scissor-type joint apart.

27. The film as claimed in claim 2, wherein the film is obtained by the method of claim 23.

* * * * *